(No Model.)

W. C. SHELDON.
TOBACCO MOISTENER.

No. 501,371. Patented July 11, 1893.

Witnesses.
J. M. Fowler Jr.
Aly Stewart

Inventor
Willard C. Sheldon
By Church & Church
his Attorneys

UNITED STATES PATENT OFFICE.

WILLARD C. SHELDON, OF GRAND HAVEN, MICHIGAN.

TOBACCO-MOISTENER.

SPECIFICATION forming part of Letters Patent No. 501,371, dated July 11, 1893.

Application filed March 27, 1893. Serial No. 467,775. (No model.)

*To all whom it may concern:*

Be it known that I, WILLARD C. SHELDON, of Grand Haven, in the county of Ottawa and State of Michigan, have invented certain new and useful Improvements in Tobacco-Moisteners; and I do hereby declare the following to be a full, clear, and exact description of the same, reference being had to the accompanying drawings, forming a part of this specification, and to the letters of reference marked thereon.

This invention has for its object to provide a device for supplying moisture or humidifying the air of boxes or cases in which tobacco is stored, or of compartments of any kind, which will automatically regulate and expose to the air the desired amount of water or liquid to be evaporated, and which will be capable of being separated for filling or storage and transportation.

To these ends, the invention consists in certain novel details of construction and combinations and arrangements of parts, all as will be now described and pointed out specifically in the claims at the end of this specification.

Figure 1:
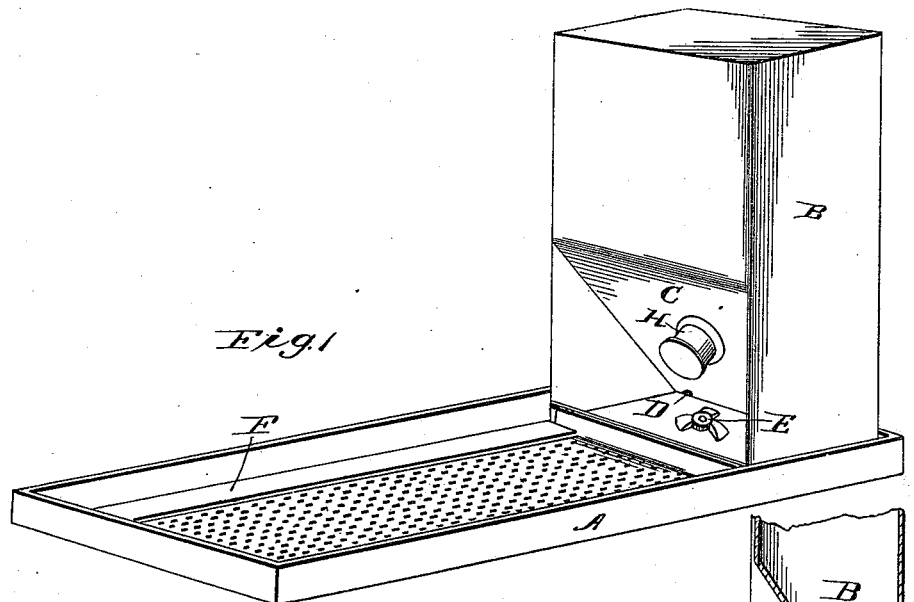
Figure 2:
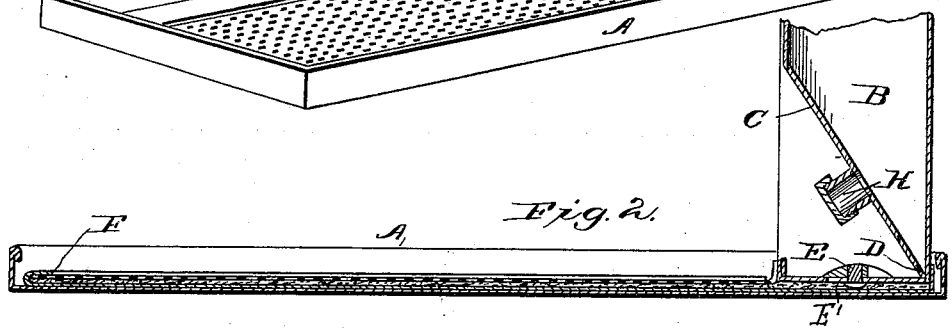
Figure 3:
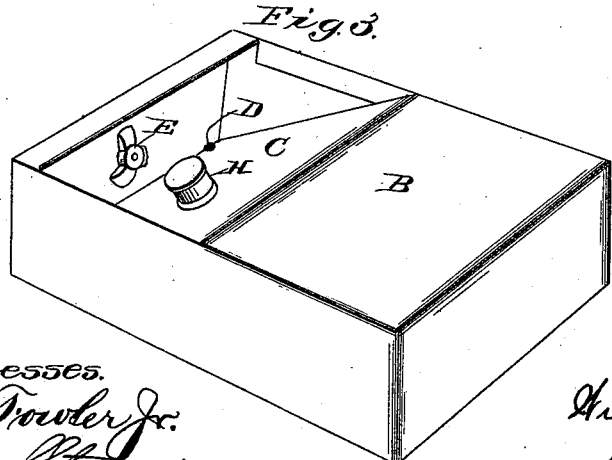

Referring to the accompanying drawings: Figure 1 is a perspective view of a moistener constructed in accordance with my present invention. Fig. 2 is a longitudinal vertical section of the same. Fig. 3 is a perspective view of the tank removed from the pan and ready for filling.

Similar letters of reference indicate the same parts in all the figures.

In the preferred form of apparatus wherein the present invention is carried into effect, I provide an evaporating pan such as A, preferably having an extended evaporating surface, and within this pan I stand at any suitable point a tank B adapted to feed the water automatically to the pan as it evaporates therefrom. For this purpose, the tank is preferably though not necessarily made rectangular, and the bottom of the front wall is inclined inward at C while the bottom is formed into a small pan or receiver for regulating the escape of the water from the tank and into the evaporating pan. As shown, the tank has relatively small apertures D formed at the lower rear edge of the inclined portion, the tops of which are below the edges of the small regulating pan, as well as below the edges of the large pan when the tank is standing therein, hence no water can escape from the tank until that in the pans has evaporated to a level below the tops of the feed openings.

In the bottom of the regulating pan, I locate a valve E which controls the escape of water from said pan into the larger pan, through openings E'. Thus not only is the supply to the regulating pan controlled, but the supply to the large evaporating pan from the regulating pan is also controlled. This small regulating pan it will be seen, prevents the escape of water from the tank should the whole device be slightly out of level, inasmuch as a slight variation in this respect will not lower the water sufficiently in the regulating pan to uncover the feed openings, although it might if the level of the water in the larger pan were depended on, and furthermore in most instances it is desirable to provide an absorbent material in the large pan which shall be just kept moist so as to expose a large surface from which evaporation can take place. When this is desired I preferably use a separate frame F having a foraminous top and filled with absorbent material, such as cotton, and in one end of this frame, form a seat for the bottom of the tank, usually by turning up the edges of the material from which the frame F is constructed all as shown clearly in Figs. 1 and 2.

For convenience in filling, the tank is provided with an additional opening H, preferably located in the recess formed by the sides and bottom, whereby when the tank is to be filled, it may be turned down on the back as in Fig. 3, and the water simply poured into the large recess, thus is made to serve all the purposes of a funnel or other filling implement. The opening H is closed by a cap or cover of any approved character to form a water tight closure.

The whole device it will be seen, is extremely simple, easily manufactured, and even more easily taken care of and handled, inasmuch as it requires very little attention, it only being essential to see that the tank is taken out and filled and the valve E, regulated to supply the requisite amount of water to the evaporating pan.

Obviously, the size and shape of the pan and tank may be varied to suit the use to which the apparatus is to be put, thus for tobacco boxes it should be small, and for large compartments it should be large enough to render the air sufficiently humid for the purpose desired.

Having thus described my invention, what I claim as new, and desire to secure by Letters Patent, is—

1. In a humidifier, the combination with the extended evaporating pan, of the closed tank therein having the feeding openings at the bottom, and the small regulating pan having its edges higher than the top of the openings with a communication between said regulating pan and evaporating pan, substantially as described.

2. In a humidifying device, the combination with the extended evaporating pan and the small regulating pan having a valve for opening communication with the evaporating pan, of the tank closed at the top and having the small feed openings within the regulating pan, whereby the escape of water from the tank is regulated by the amount of water in the regulating pan; substantially as described.

3. In a humidifying device, the combination with the extended evaporating pan, of the tank closed at the top and having the small feed apertures at the bottom, and the small regulating pan formed on the bottom of the tank whereby the amount of water escaping through the feed apertures is regulated, and a communication between the regulating pan and evaporating pan; substantially as described.

4. In a humidifying device, the combination with the extended evaporating pan and the frame therein holding the absorbent material, of the removable tank closed at the top and having the small feed apertures at the bottom, the small regulating pan on the bottom of the tank for controlling the feed of water through said apertures and the valve in said regulating pan, controlling the flow of water therefrom to the evaporating pan; substantially as described.

WILLARD C. SHELDON.

Witnesses:
B. FRANK HARBECK,
W. F. HARBECK.